(12) United States Patent
Heirich

(10) Patent No.: US 6,493,045 B1
(45) Date of Patent: Dec. 10, 2002

(54) ENCLOSURE ASSEMBLY

(75) Inventor: Douglas L. Heirich, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/476,408

(22) Filed: Dec. 30, 1999

(51) Int. Cl.⁷ .............................................. A47B 81/06
(52) U.S. Cl. ...................... 348/836; 248/922; 312/7.2
(58) Field of Search ........................... 312/7.2; 348/836, 348/343; 248/917, 922

(56) References Cited

U.S. PATENT DOCUMENTS

| | | | | |
|---|---|---|---|---|
| 4,853,790 A | * | 8/1989 | Dickie | 348/836 X |
| 5,806,940 A | * | 9/1998 | Heirich | 348/836 X |
| 5,934,772 A | * | 8/1999 | Sung | 312/7.2 |
| 5,956,101 A | * | 9/1999 | Yang | 312/7.2 X |
| 5,969,776 A | * | 10/1999 | Han | 312/7.2 X |
| 5,990,985 A | * | 11/1999 | Kim | 348/836 |
| 6,104,444 A | * | 8/2000 | Han et al. | 348/836 |

* cited by examiner

Primary Examiner—Peter M. Cuomo
Assistant Examiner—Michael J. Fisher
(74) Attorney, Agent, or Firm—Henneman & Saunders; Larry E. Henneman, Jr.

(57) ABSTRACT

A computer monitor case (10) having a subframe (28) with an intermediate bucket (12) affixed thereto to form a front assembly (56). A top bucket (14) is affixed to a bottom bucket (16) by rivets (52) to form a rear assembly (55). The rear assembly (55) is affixed to the front assembly (56) by top fastening clips (36) wide fastening clips (38) and narrow fastening clips (40). Alignment pins (34) on the subframe (28) align with alignment pin notches (42) and side alignment pin notches (64) on the intermediate bucket (12) and top bucket (14) respectively. Side lips (62) and a front lip (58) on the top bucket (14), attachment ribs (50) on the top bucket (14) and bottom bucket (16), and an intermediate bucket lip (44) on the intermediate bucket (12) provide rigidity and alignment and are used in conjunction with other components as fastening means to hold the computer monitor case (10) together.

39 Claims, 10 Drawing Sheets

ENCLOSURE ASSEMBLY

A portion of the disclosure of the patent document contains material which is subject to copyright protection. The owner has no objection to the facsimile reproduction by any one of the patent disclosure, as it appears in the Patent and Trademark Office patent files of records of any country, but otherwise reserves all rights whatsoever.

TECHNICAL FIELD

The present invention relates to the field of mechanical construction, and more particularly to an improved electronic component case apparatus and associated method for construction thereof. The predominant current usage of the present inventive computer monitor case apparatus and method is in the construction of a partially semi-transparent computer monitor housing, wherein the simplicity and lack of obtrusive support structures is desirable both mechanically and aesthetically.

BACKGROUND ART

In the design of an electronic component housing, such as the housing for a computer monitor, it is desirable to have a structure which is rigid, and yet wherein the structures which provide such rigidity are not obtrusive. The parts of the housing should align well with each other, and the means for fastening such parts together should not mar the clean lines of the external structure. Also, the case should be easy to assemble, and inexpensive to manufacture. Such objectives have been difficult enough in much of the prior art, and the research continues as to how best to achieve all of the objectives. Moreover, the now popular trend toward translucent and semi-transparent case structures further complicates these issues. In an opaque case structure, ribs, bosses, and the like, which contribute to rigidity can be readily disbursed about the interior of the case structure without marring the appearance thereof. However, in a translucent case, care must be taken as to the placement of such structures even on the inside of the case, as they will likely show through to the exterior. In the past, it has been the conventional practice to construct monitor housings from opaque materials such that it has been easy to conceal whatever attachment means and/or rigidity means are employed. However, it has recently become popular to construct the housings of electronic devices, such as monitors, from colored transparent materials so that the working components of the devices are visible through the housing. While this is primarily an aesthetic improvement, it has a distinctly functional aspect. That is, in the effort to make monitors and the like, more aesthetically pleasing (and thus more marketable) it is important to retain mechanical integrity and strength in the product.

It would be desirable to have a case structure which is easily assembled, well aligned, rigid, and strong, and yet in which the features which provide these advantages are not readily visible, even when the case is constructed from a translucent or semi-transparent material. However, to the inventor's knowledge, no such case structure has existed in the prior art. To the inventor's knowledge, no method has existed in the prior art which effectively retains the aesthetic aspects of a clear monitor housing, while retaining mechanical strength sufficient to produce a reliable product. All methods which might have previously been used have either presented unsightly blemishes visible through the monitor housing, or else have been insufficiently strong and rigid, or else have been too expensive to employ, or some combination of these problems.

DISCLOSURE OF THE INVENTION

Accordingly, it is an object of the present invention to provide a case structure which is rigid and strong.

It is another object of the present invention to provide a case structure which is easy and inexpensive to manufacture and to assemble.

It is yet another object of the present invention to provide a case that is aesthically pleasing, and relatively free from visible support and rigidity features.

It is still another object of the present invention to provide a computer monitor case which is constructed, at least partially, from a translucent material, and yet in which rigidity and fastening features are not obtrusively visible through such translucent material.

Briefly, an embodiment of the present invention is a computer monitor housing having an interior subframe and a plurality of external case components affixed thereto. The external case components have rigidity provided by the general shape and by edge flanges thereof. No reinforcement structures are provided in each of the external case components, except around the edges thereof. The reinforcement flanges around the edges of the external case components have a plurality of alignment features for aligning the external case components to each other and to the subframe. Further, the reinforcement flanges also have fastening features for attaching the external case components to each other and to the subframe. The assembled computer monitor case is rigid and well aligned, and yet it is aesthetically pleasing, in large part due to the fact that all rigidity, alignment, and fastening features are located at the edges of the individual external case components, where they are not very noticeable from the outside of the computer monitor case.

An advantage of the present invention is that there are no ribs or bosses on the surface of external case components.

Another advantage of the present invention is that a housing will be aesthetically pleasing and free from unsightly blemishes as viewed from the outside of the housing.

A further advantage of the present invention is that a computer monitor housing is easy and inexpensive to manufacture.

Yet another advantage of the present invention is that a computer monitor housing is mechanically strong and structurally rigid.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION OF THE INVENTION

Figure 1:
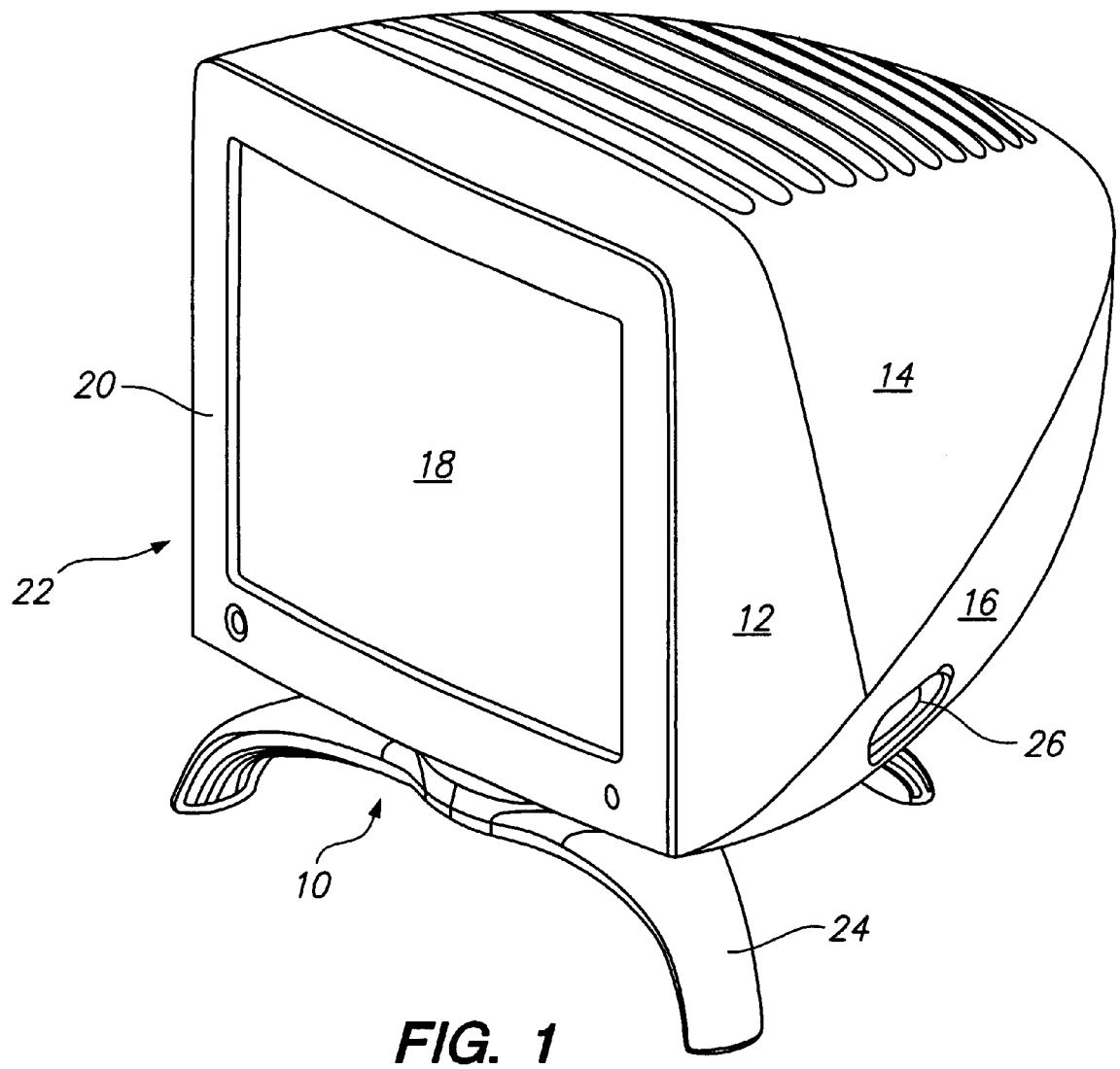
FIG. 1 is perspective view of an assembled computer monitor case 10.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is embodied in an improved monitor housing, which is depicted in the perspective view of FIG. 1 and designated therein by the general reference character 10. As can be seen in the view of FIG. 1, the computer monitor case 10 has an intermediate bucket 12, a top bucket 14, and a bottom bucket 16 which, together, form the primary aspects of the computer monitor case 10 which are visible from the exterior thereof. In the view of FIG. 1 can also be seen a viewing screen 18 and surrounding bezel 20, which are aspects of a complete computer monitor 22, but which are not a part of the present invention and will not be discussed in greater detail herein. As can also be seen in the view of FIG. 1, the computer monitor 22 is fitted with a leg assembly 24. On the exterior of the computer monitor case are several access features 26, one of which is visible in the view of FIG. 1. The access features 26 are merely covered apertures in the computer monitor case 10 through which access can be had to the electrical connectors and controls of the computer monitor 22.

Figure 2:
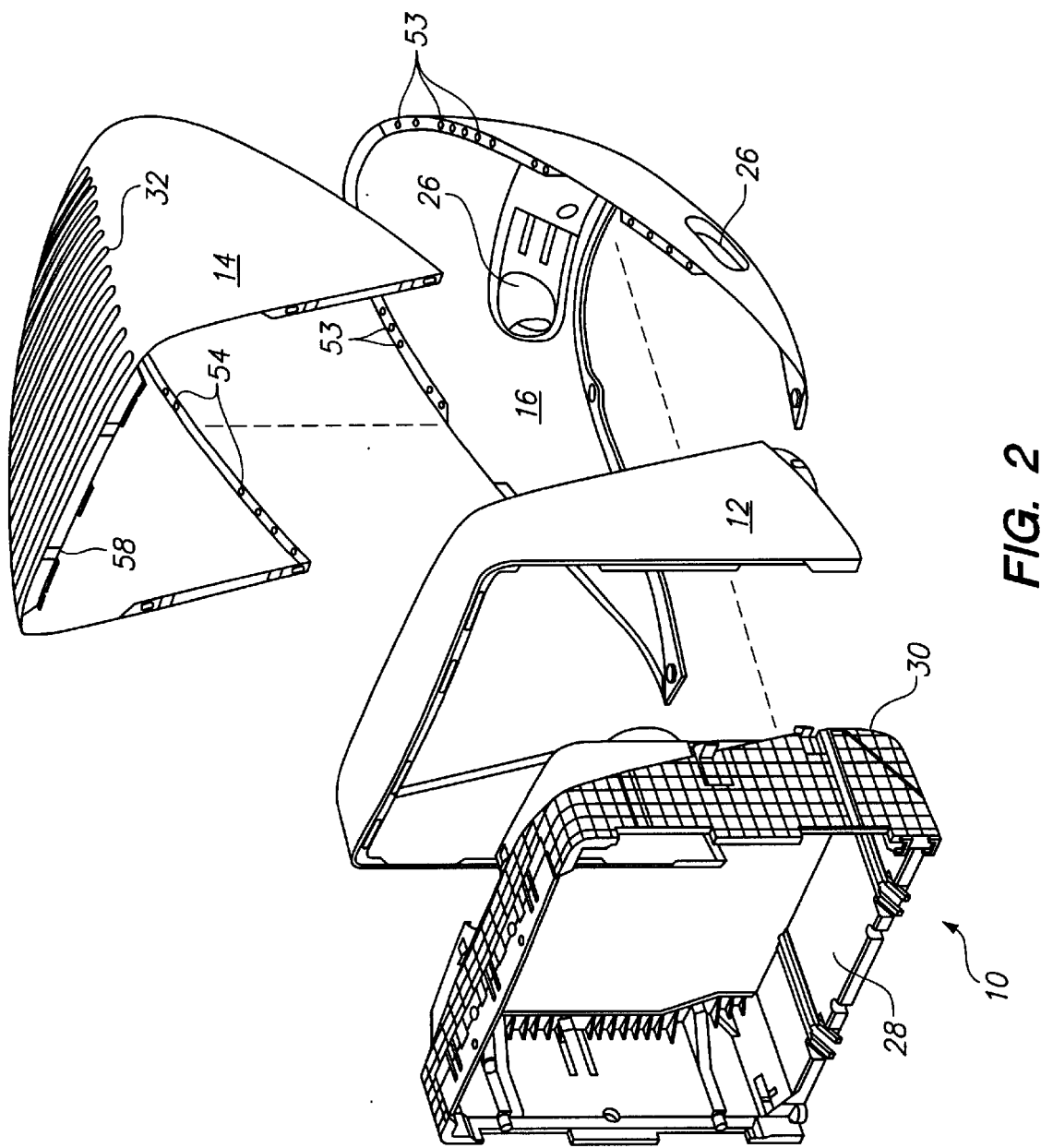
FIG. 2 is an exploded front perspective view of computer monitor case 10.

FIG. 2 is an exploded front perspective view of computer monitor case 10. In the view of FIG. 2 can be seen a subframe 28 about which the computer monitor case 10 is assembled. The subframe has rigidity provided by a somewhat honeycomb like exterior surface 30 which will be discussed in more detail, hereinafter. In the view of FIG. 2 can also be seen two of the access features 26. A plurality of ventilation slots 32 are also visible in the top bucket 14.

Figure 3:
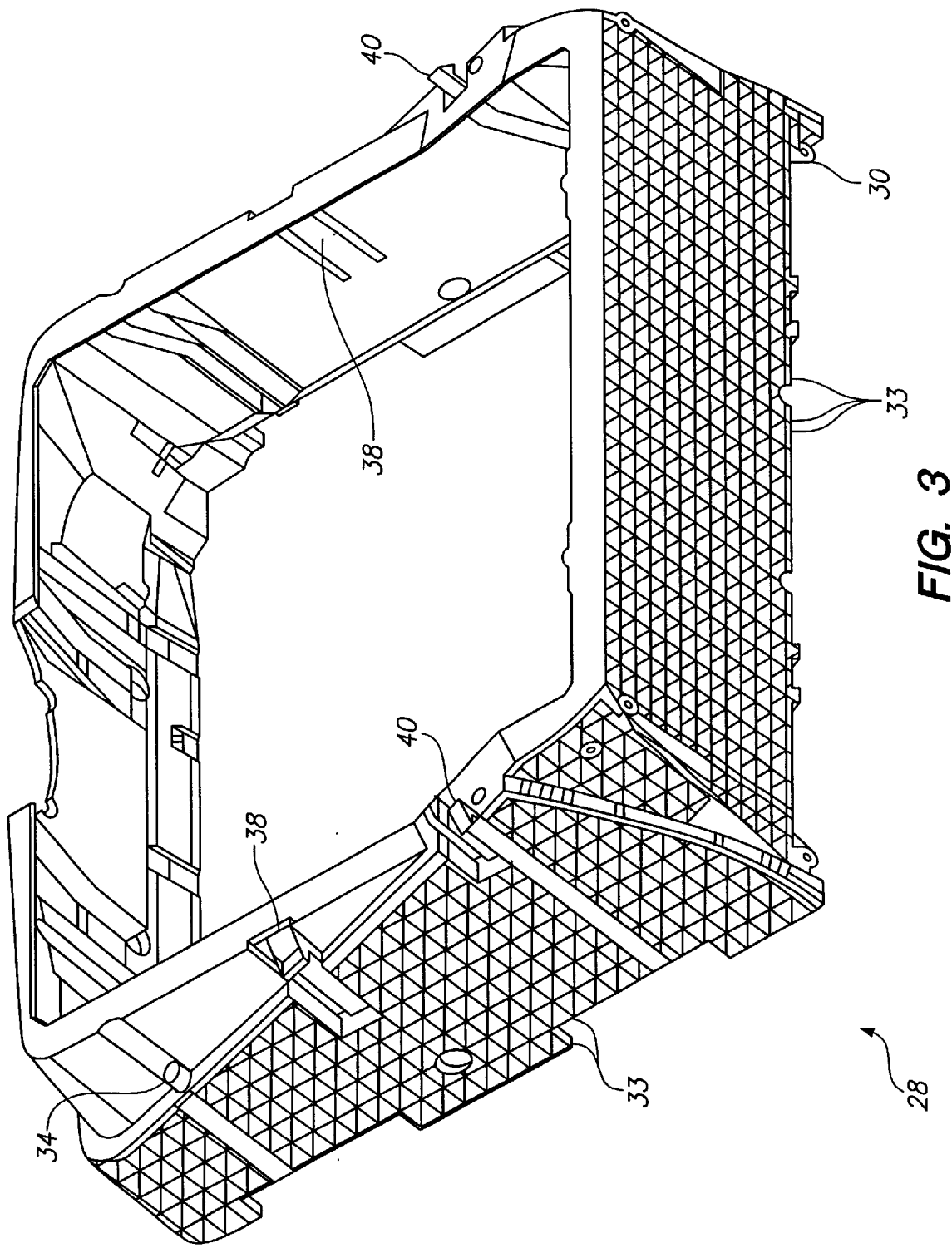
FIG. 3 is a rear perspective view of the subframe of FIG. 2.
Figure 4:
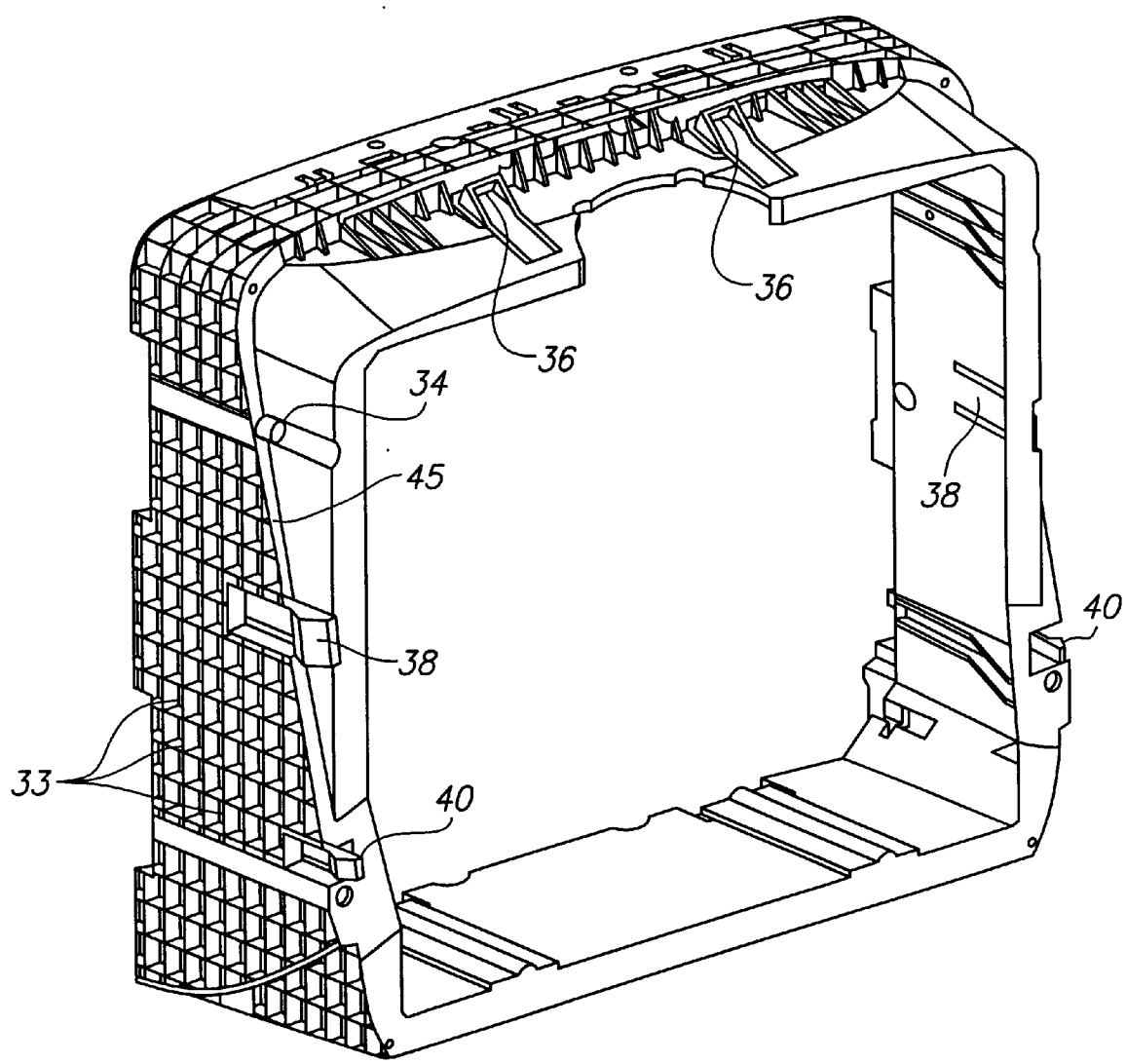
FIG. 4 is an alternate rear perspective view of the subframe of FIGS. 2 and 3.

FIG. 3 and FIG. 4 are two different perspective views of the subframe 28. In the views of FIGS. 3 and 4 it can more clearly be seen that the exterior surface 30 of the subframe 28 is formed from a plurality of intersecting outward projecting ridges 33 which, in this example of the invention, form small squares on the exterior surface 30. In the views of FIGS. 3 and 4 can also be seen one of two alignment pins 34, two top fastening clips 36 (not visible in FIG. 3), two wide fastening clips 38 and two narrow fastening clips 40, the functions of each of which will be discussed hereinafter.

Figure 5:
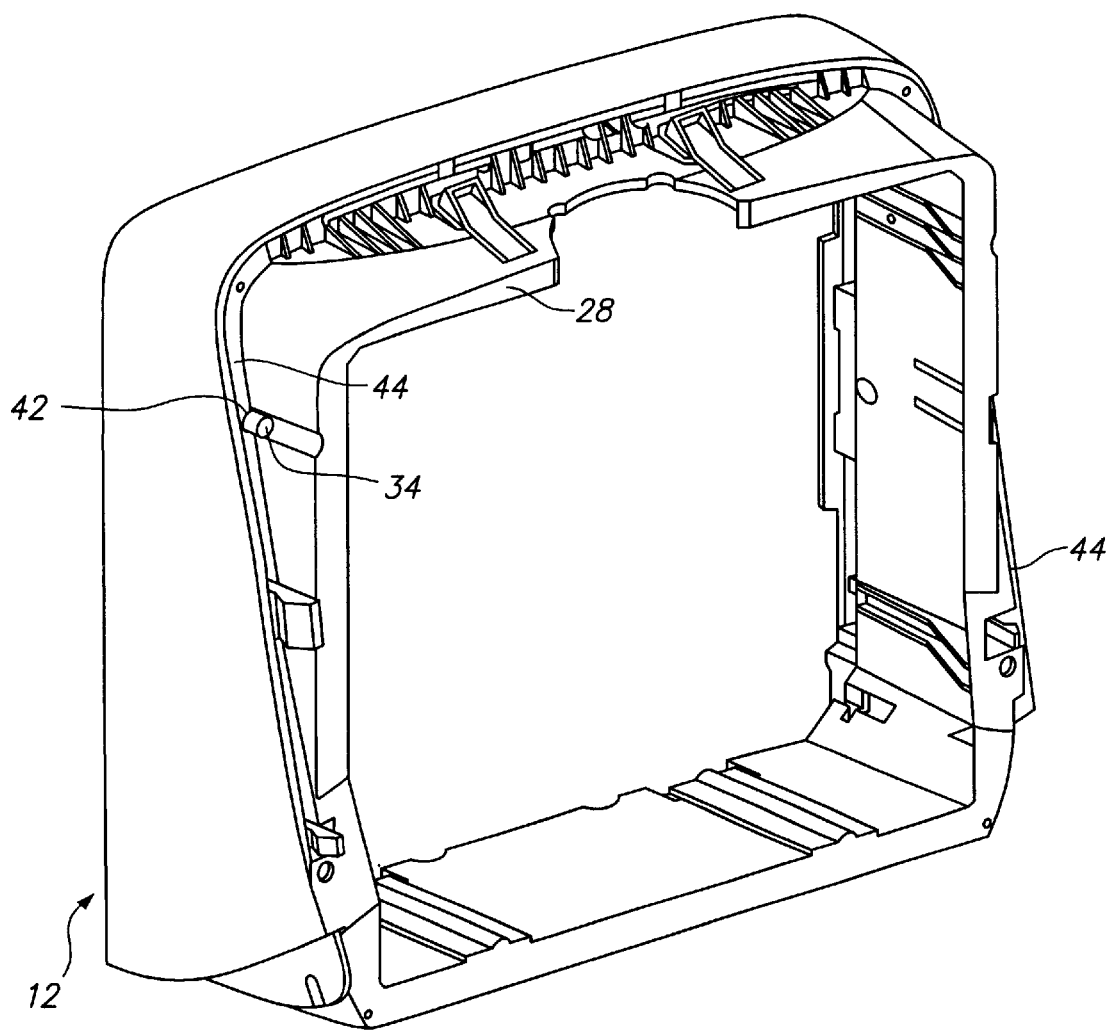
FIG. 5 is a rear perspective view of an assembled subframe and intermediate bucket.

FIG. 5 is a perspective view of the intermediate bucket 12 assembled to the subframe 28. As can be seen in the view of FIG. 5, the alignment pins 34 of the subframe 28 are inserted through two (one of which is visible in the view of FIG. 5) alignment pin notches 42 in an intermediate bucket lip 44. The intermediate bucket lip 44 is formed around the rear edge of the intermediate bucket 12. The intermediate bucket lip 44 adds rigidity to the intermediate bucket 12 and positions, aligns and holds in place the intermediate bucket 12, as described herein. The intermediate bucket lip 44 abuts against a receiving ridge 45 (FIG. 4) of the subframe 28 and is aligned thereon by the alignment pins 34 and alignment pin notches 42, as described previously herein. The intermediate bucket 12 will be held in place by the attachment of the top bucket 14 and the bottom bucket 16 to the subframe 28, as will be described hereinafter.

Figure 6:
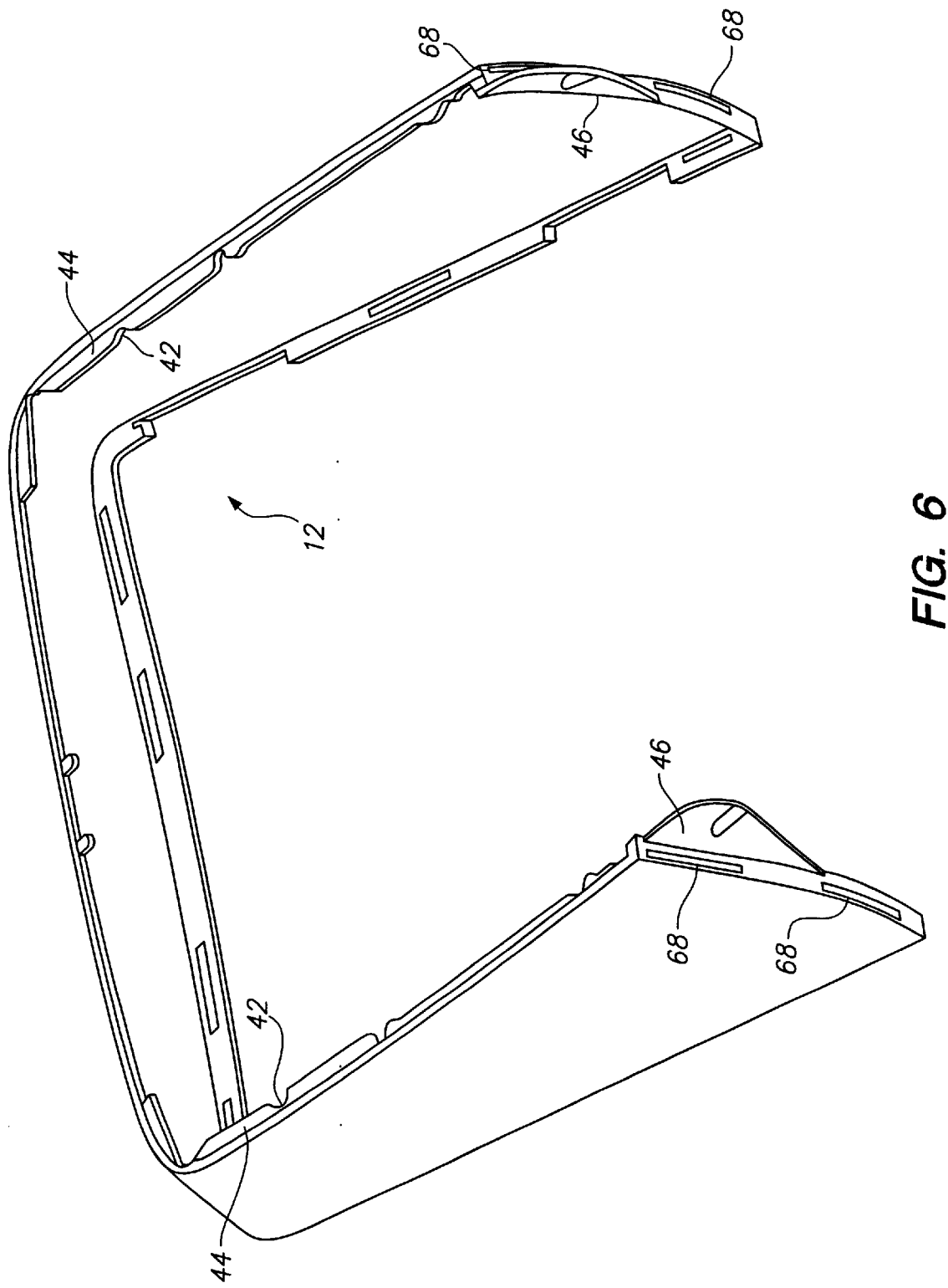
FIG. 6 is a rear perspective view of the intermediate bucket of FIG. 5.

FIG. 6 is a rear perspective view of the intermediate bucket 12 in which the intermediate bucket lip 44 and the alignment pin notches 42 can be more readily observed. Also, in the view of FIG. 6 can be seen two interior alignment tabs 46, each of which has a screw hole 48 therein. Optionally, a screw (not shown) could be used to secure the intermediate bucket 12 to the subframe 28 (FIG. 5), although this option is not used in the embodiment described herein.

Figure 7:
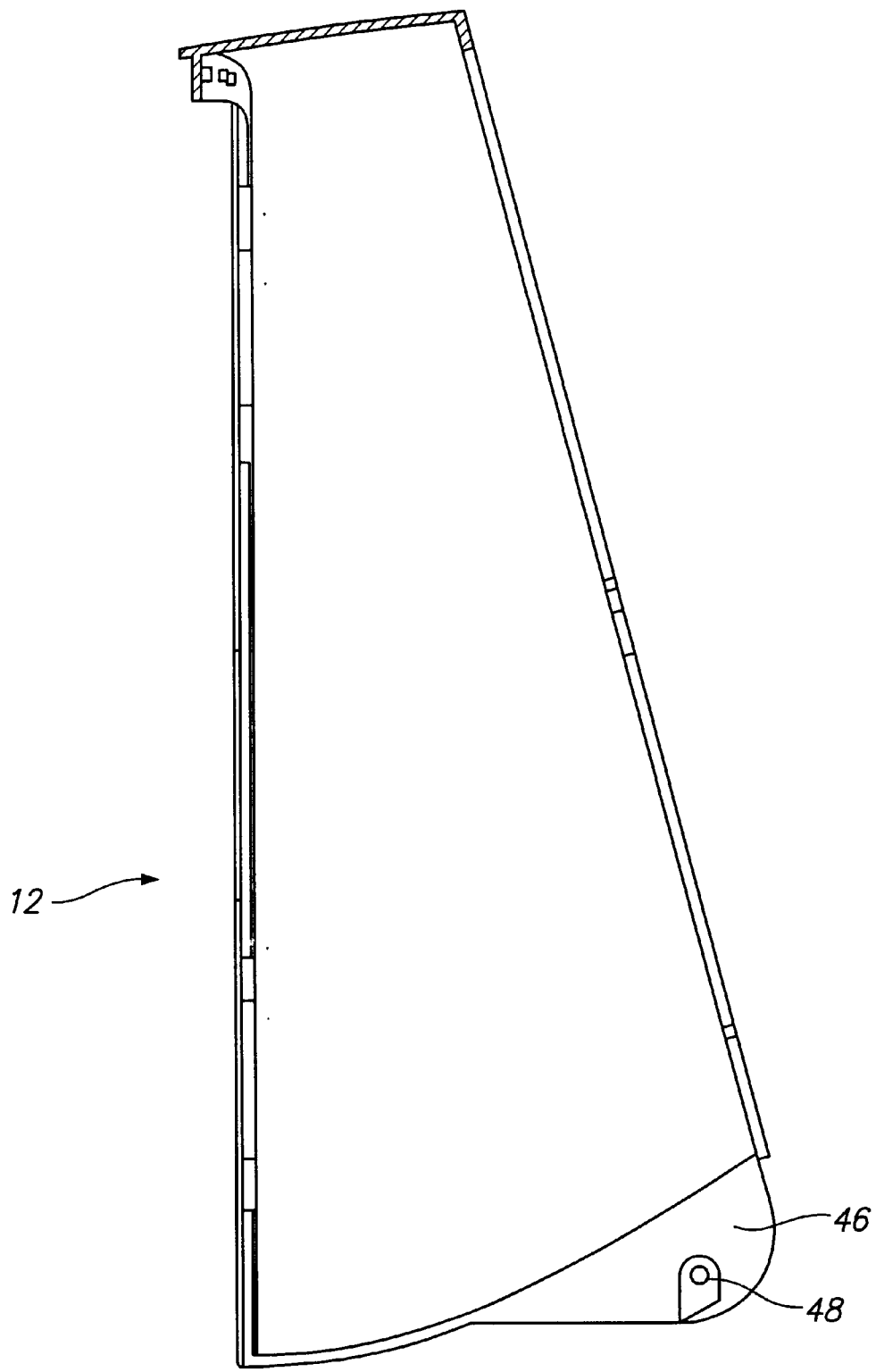
FIG. 7 is a cross sectional side elevational view of the intermediate bucket of FIGS. 5 and 6.

FIG. 7 is a cross sectional side elevational view of the intermediate bucket 12. In the view of FIG. 7, the screw hole 48 can be more clearly seen on the interior alignment tab 46.

Figure 8:
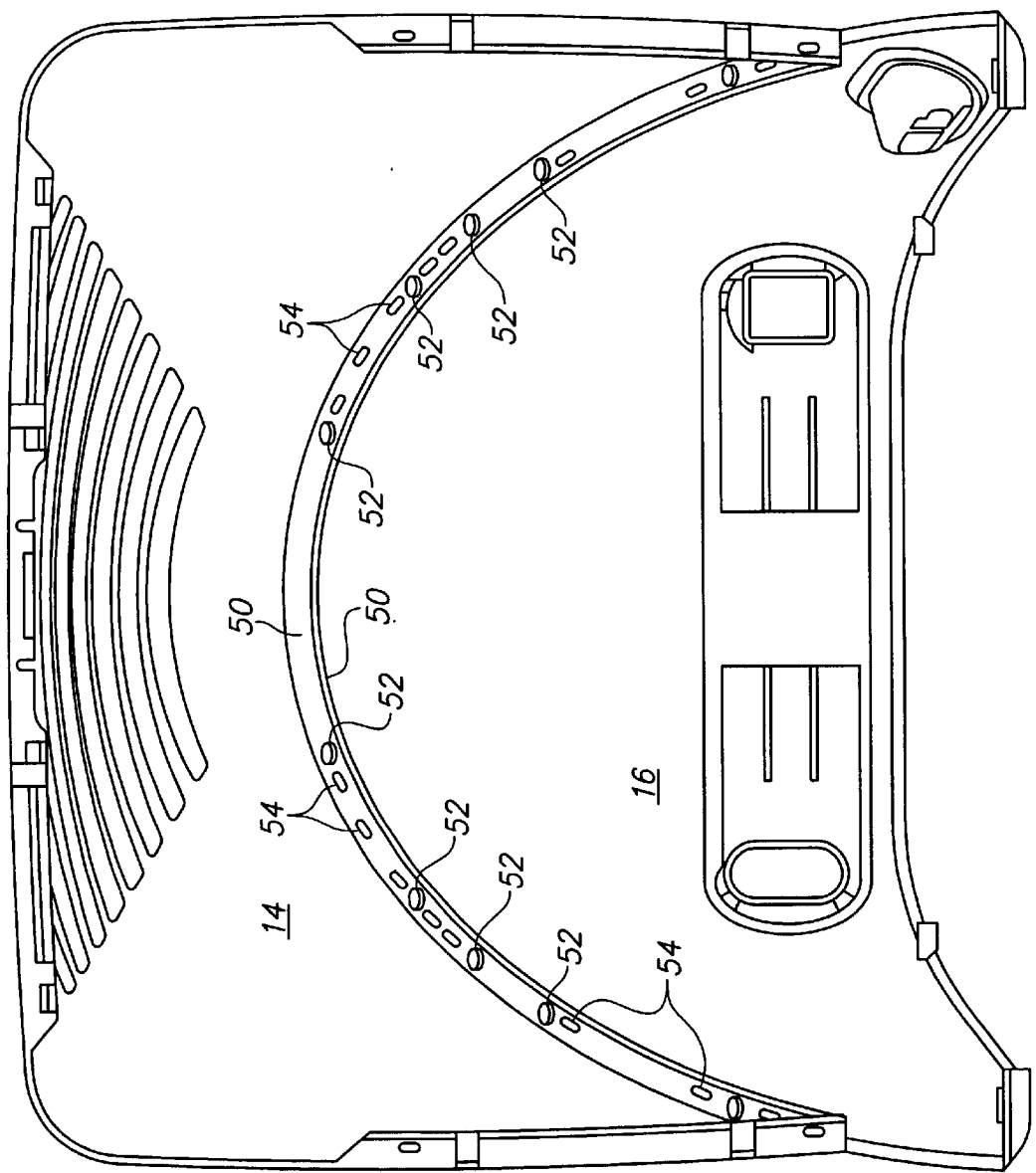
FIG. 8 is a front elevational view of the top bucket of FIG. 1.

FIG. 8 is a front elevational view of the assembled top bucket 14 and bottom bucket 16. The top bucket 14 and bottom bucket 16 each have an attachment rib 50 along mating edges thereof. A plurality (eight of which are shown in the view of FIG. 8) of rivets 52 hold the two attachment ribs 50 together, thereby affixing the top bucket 14 to the bottom bucket 16. It should be noted that it is within the scope of the invention that the top bucket 14 and the bottom bucket 16 could be formed as a single piece, thereby eliminating the necessity to attach the top bucket 14 to the bottom bucket 16. As can be seen in the view of FIG. 2, the bottom bucket 16 has a plurality of bucket alignment projections 53 which fit into a like plurality of bucket alignment apertures 54 (FIGS. 2 and 8) on the top bucket 14 for aligning the top bucket 14 with the bottom bucket 16.

Figure 9:
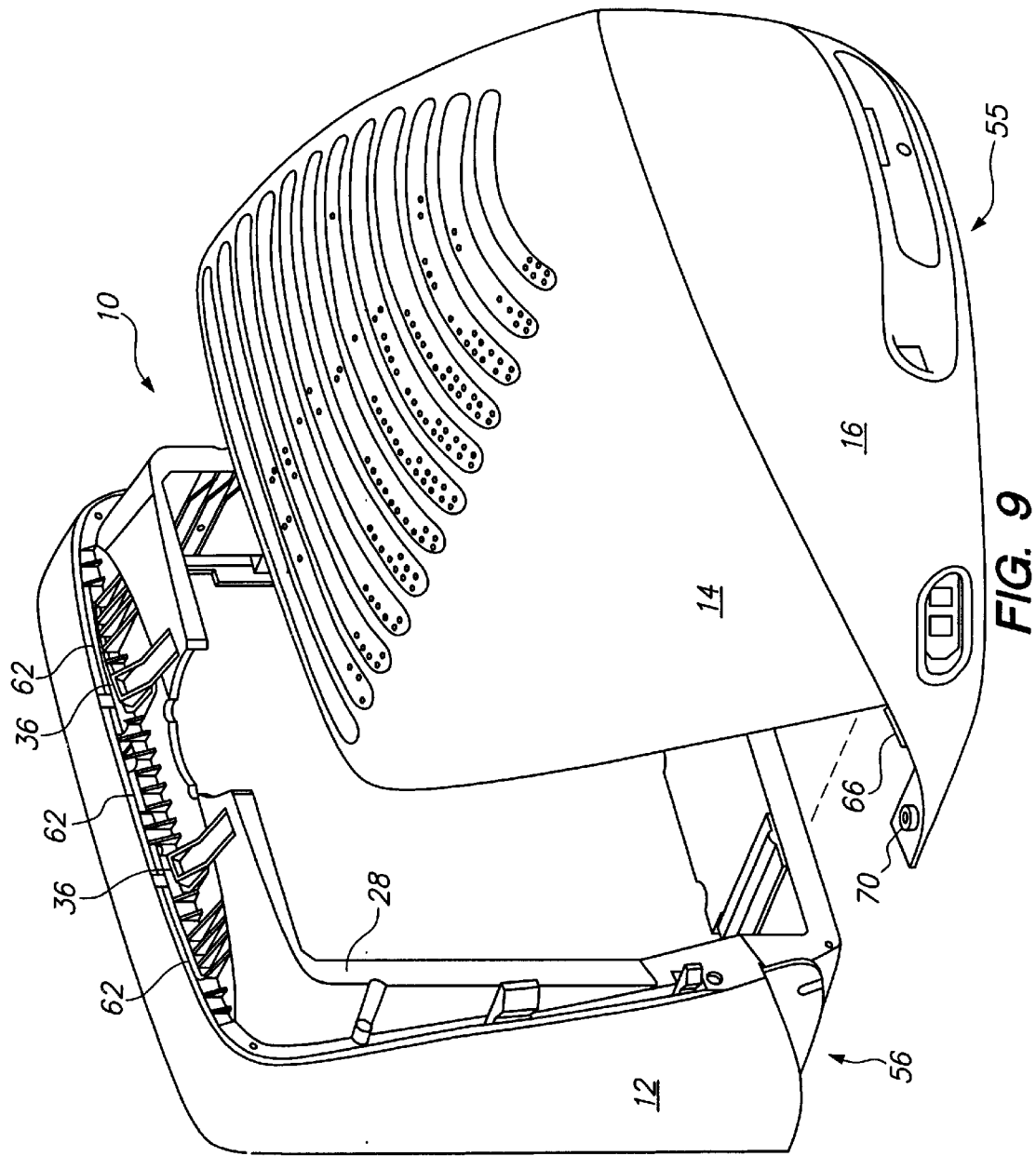
FIG. 9 is an exploded rear perspective view of the computer monitor case of FIGS. 1 and 2.
Figure 10:
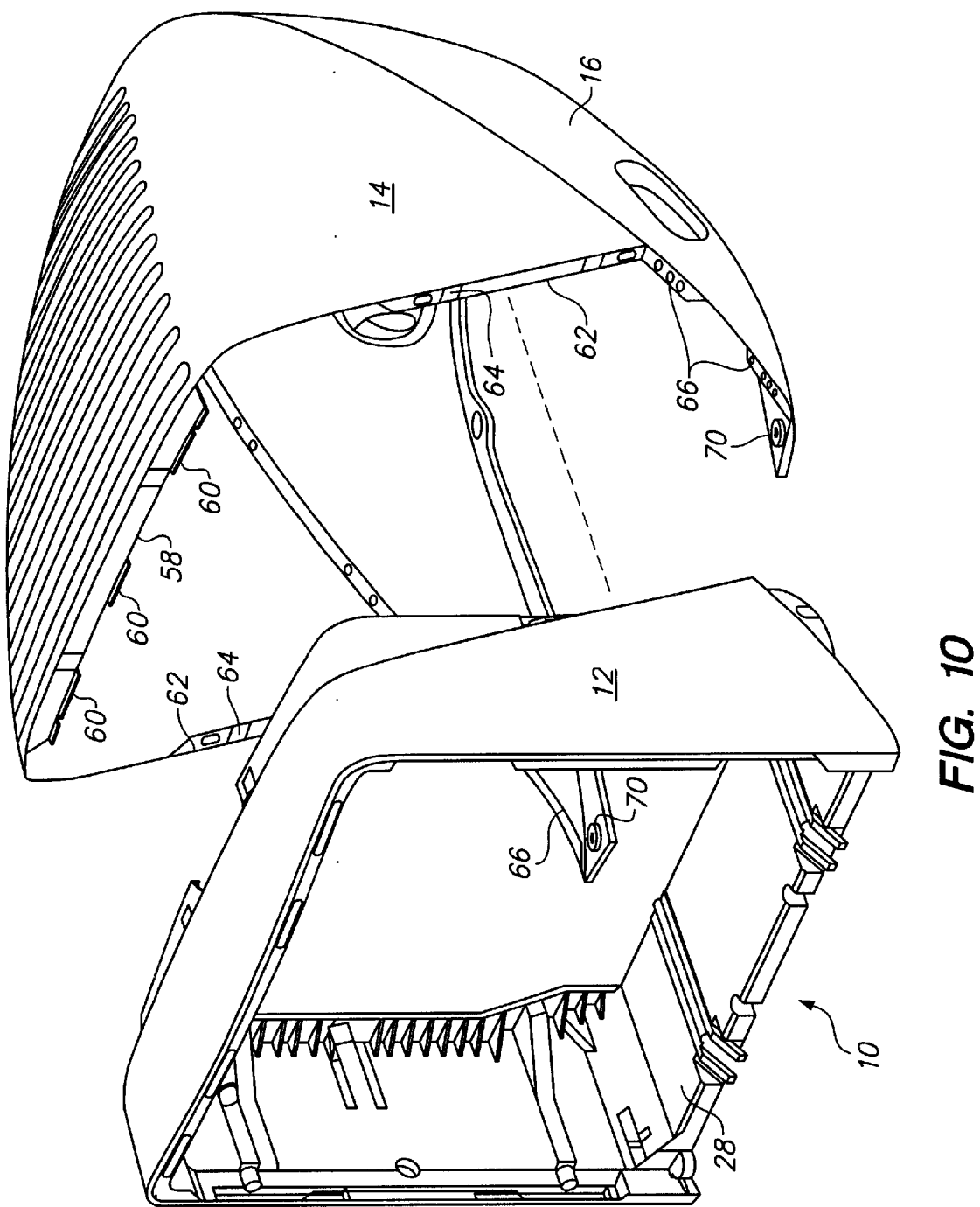
FIG. 10 is an exploded front perspective view of the computer monitor case of FIGS. 1, 2 and 9.

FIG. 9 is a rear exploded perspective view of the computer monitor case 10 showing the assembled top bucket 14 and bottom bucket 16 (a rear assembly 55) and an assembled intermediate bucket 12 and subframe 28 (a front assembly 56), and FIG. 10 is a front perspective view of the computer monitor case 10 showing the rear assembly 55 exploded from the front assembly 56. Connection of the rear assembly 55 to the front assembly 56 will be discussed herein with reference to FIGS. 9 and 10. To assemble the rear assembly 55 to the front assembly 56, a front lip 58 of the rear assembly 55 is hooked behind the top fastening clips 36 on the subframe 28. A plurality (three, in this present example) of front lip alignment projections 60 align with and fit into a like plurality of front lip apertures 62 on the front assembly 56. As can be seen in the view of FIG. 10, the top bucket 14 of the rear assembly 55 also has two opposed side lips 62.

The front lip 58 and the side lips 62 are bent over portions of the top bucket 14 which add rigidity and strength to the rear assembly 55 and also provide for the attachment and alignment thereof the front assembly 56 as discussed hereinafter.

Each of the side lips 62 has a side alignment pin notch 64 for aligning with and fitting over the corresponding alignment pins 34 on the subframe 28. The wide fastening clips 38 and the narrow fastening clips 40 each clip behind the respective side lips 62 to hold the rear assembly 55 to the front assembly 56. If desired, the rear assembly 55 can be removed from the front assembly 56 by depressing all of the fastening clips 36,38 and 40 through the crack left between the assembled rear assembly 55 and front assembly 56.

Referring again to the initial assembly of the computer monitor case 10, as the rear assembly 55 is brought into contact with the front assembly 56, the interior alignment tabs 46 are guided inside the respective sides of the rear assembly 55. A plurality (two per side) of bottom alignment projections 66 fit into a like plurality of alignment tab receptor slots 68 (FIG. 6) located on the bottom of the intermediate bucket 12. The alignment projections 66 are narrower at their distal end than at their proximal end to form a wedge shape such that the bottom alignment projections 66 readily fit into the alignment tab receptor slots 68 and further such that the rear assembly 55 is well aligned with the front assembly 56 as the bottom alignment projections 66 are fully inserted into the alignment tab receptor slots 68. Optionally, two screws (not shown) can be inserted through two bottom screw holes 70 on the bottom bucket 16 and screwed into the bottom of the subframe 28.

Various modifications may be made to the invention without altering its value or scope. For example, it will be noted that the shape and quantity of components, as described herein in relation to the example of the invention her presented, are not a critical part of the invention. Indeed, it is anticipated that different applications, such as cases of different sizes, will require the modification of the invention is aspects such as quantity, size, and shapes of particular component aspects.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer monitor case 10 can be readily adapted for use with essentially any size or type of monitor screen and associated electronics. As discussed herein, the invention, and particularly the embodiment described by way of example herein, has be developed such that unsightly moldings will not mar the visual aesthetic aspect of the computer monitor case 10 when the computer monitor case 10 is made of transparent or semi-transparent materials. It is intended that the invention will be widely used in the construction of cases for electronic components, and the like, wherein the aesthetic aspect of the cases are an important part of the marketability, and thus of the practicality of producing, such components. Therefore, although the invention has been described herein in relation to an improved bezel mount method and apparatus, one skilled in the art will recognize that the described invention could readily be applied to essentially any part of the shell of essentially any type of appliance, component, or the like, wherein it is desired to have a rigid attachment means which does not require a molding that might be seen through the shell.

Since the improved computer monitor case 10 of the present invention may be readily produced, and since the advantages as described herein are provided, it is expected that they will be readily accepted in the industry. For these and other reasons, it is expected that the utility and industrial applicability of the invention will be both significant in scope and long-lasting in duration.

I claim:

1. An improved computer monitor case housing, comprising:

a subframe;

an intermediate bucket generally covering the subframe; and a rear assembly affixed to the subframe by a mounting lip extending along an edge of the rear assembly; and wherein said intermediate bucket and said rear assembly each form at least a portion of the exterior of said housing.

2. The improved computer monitor case housing of claim 1, wherein:

the rear assembly includes a top bucket and a bottom bucket;

the top bucket has a top bucket attachment lip extending from an edge thereof, said top bucket attachment lip having an outer surface continuous with an outer surface of said top bucket;

the bottom bucket has a bottom bucket attachment lip extending from an edge thereof, said bottom bucket attachment lip having an outer surface continuous with an outer surface of said bottom bucket; and the top bucket attachment lip is affixed to the bottom bucket attachment lip, with the outer surface of said top bucket attachment lip abutting the outer surface of said bottom bucket attachment lip.

3. The improved computer monitor case housing of claim 2, wherein;

the top bucket attachment lip is affixed to the bottom bucket attachment lip by rivets.

4. The improved computer monitor case housing of claim 1, wherein:

the subframe has an exterior surface having thereon a plurality of outward projecting structural reinforcement ridges.

5. The improved computer monitor case housing of claim 4, wherein:

at least some of the outward projecting ridges intersect others of the outward projecting ridges.

6. The improved computer monitor case housing of claim 1, wherein:

the subframe has thereon a plurality of alignment projections; and the intermediate bucket has a plurality of alignment apertures through which the alignment projections project.

7. The improved computer monitor case housing of claim 6, wherein:

the alignment projections are alignment pins; and the alignment apertures are notches in a lip of the intermediate bucket.

8. The improved computer monitor case housing of claim 6, and further including:

a second plurality of alignment apertures on the mounting lip of the rear assembly.

9. The improved computer monitor case housing of claim 8, wherein:

the second plurality of alignment apertures are on a top bucket of the rear assembly.

10. The improved computer monitor case housing of claim 9, wherein:

the alignment projections are alignment pins; and the alignment apertures are notches in a lip of the top bucket.

11. The improved computer monitor case housing of claim 1, and further including:

a plurality of clips disposed on the subframe to grasp the mounting lip of the rear assembly to hold the rear assembly against the subframe.

12. The improved computer monitor case housing of claim 11, wherein:

the clips are a integral part of the subframe.

13. The improved computer monitor case housing of claim 1, and further including:

a plurality of alignment projections on the mounting lip of the rear assembly for inserting into a like plurality of alignment apertures on the intermediate bucket.

14. The improved computer monitor case housing of claim 13, wherein:

the alignment projections are generally wedge shaped.

15. The improved computer monitor case housing of claim 1, and further including:

a plurality of alignment tabs on the subframe for aligning with and holding a top portion of the mounting lip of the rear assembly.

16. The improved computer monitor case housing of claim 15, wherein:

the top portion of the mounting lip is on a top bucket of the rear assembly.

17. The improved computer monitor case housing of claim 1, wherein:

at least one of the intermediate bucket and the rear assembly is constructed of a translucent material.

18. The improved computer monitor case housing of claim 1, wherein:

at least one of the intermediate bucket and the rear assembly is constructed of a transparent material.

19. The computer monitor case housing of claim 1, wherein said rear assembly includes a plurality of arcuate shells joined to one another by lips along the edges of said shells.

20. The computer monitor case housing of claim 19, wherein the inner surfaces of said arcuate shells are free of reinforcing support structures.

21. The improved computer monitor case housing of claim 19, wherein the joined lips of said arcuate shells form an arched reinforcing structure.

22. The improved computer monitor case housing of claim 1, wherein:

the rear assembly includes a top bucket and a bottom bucket;

the top bucket has a top bucket attachment lip extending from an edge thereof, in a direction generally perpendicular to an outer surface of said top bucket adjacent said top bucket attachment lip;

the bottom bucket has a bottom bucket attachment lip extending from an edge thereof, in a direction generally perpendicular to an outer surface of said bottom bucket adjacent said bottom bucket attachment lip; and the top bucket attachment lip is affixed to the bottom bucket attachment lip.

23. A monitor housing, comprising:

a subframe;

a plurality of bucket segments, each of said bucket segments having a lip at least partially projecting inward along an edge thereof; and a plurality of alignment features on the lips and on the subframe; and wherein said bucket segments are affixed to one another and to said subframe by said lips to form at least a portion of the exterior of said monitor housing.

24. The monitor housing of claim 23, wherein:

the alignment features include alignment pins on the subframe and alignment apertures on at least one of the bucket segments.

25. The monitor housing of claim 24, wherein:

the alignment apertures are notches on an intermediate bucket segment.

26. The monitor housing of claim 24, wherein:

the alignment apertures are notches on a top bucket segment.

27. The monitor housing of claim 23, wherein:

the alignment features include alignment projections on a bottom bucket segment and corresponding alignment apertures on an intermediate bucket segment.

28. The monitor housing of claim 27, wherein:

the alignment projections are generally wedge shaped.

29. The monitor housing of claim 23, wherein:

at least two of the bucket segments are riveted together.

30. The monitor housing of claim 23, wherein:

the bucket segments include an intermediate bucket, a top bucket and a bottom bucket.

31. The monitor housing of claim 30, wherein:

the top bucket and the bottom bucket are held together by rivets.

32. The monitor housing of claim 31, wherein:

the rivets join the lip of the top bucket to the lip of the bottom bucket.

33. The monitor housing of claim 23, wherein:

the top bucket is held in place on the subframe using a plurality of clips.

34. The monitor housing of claim 33, wherein:

the clips are a molded integral part of the subframe.

35. The monitor housing of claim 23, wherein:

the bucket segments include an intermediate bucket and a rear portion.

36. The monitor housing of claim 35, wherein:

the rear portion includes a top bucket and a bottom bucket.

37. The monitor case housing of claim 23, wherein said bucket segments comprise arcuate shells.

38. The monitor case housing of claim 37, wherein the inner surfaces of said arcuate shells are free of reinforcing support structures.

39. The monitor case housing of claim 23, wherein the lips of said arcuate shells form arched reinforcing structures.

* * * * *